United States Patent [19]

Sekino et al.

[11] 4,260,870
[45] Apr. 7, 1981

[54] AUTOMATIC WELDING APPARATUS FOR UPWARD WELDING OF CURVED JOINT

[75] Inventors: Teruyoshi Sekino, Fujisawa; Takaaki Ogasawara, Kamakura, both of Japan

[73] Assignee: Kobe Steel, Limited, Kobe, Japan

[21] Appl. No.: 26,816

[22] Filed: Apr. 4, 1979

Related U.S. Application Data

[63] Continuation-in-part of Ser. No. 825,068, Aug. 16, 1977, abandoned.

[30] Foreign Application Priority Data

Aug. 16, 1976 [JP] Japan .................................. 51-98109
Oct. 21, 1976 [JP] Japan ................................ 51-126953

[51] Int. Cl.³ .............................................. B23K 9/12
[52] U.S. Cl. .............................. 219/124.33; 219/60 R; 219/73.1
[58] Field of Search .................... 219/73.1, 59.1, 60 R, 219/126, 124.1, 124.22, 124.33, 76.15

[56] References Cited

U.S. PATENT DOCUMENTS

| | | | |
|---|---|---|---|
| 2,927,195 | 3/1960 | Arnaud | 219/124.33 |
| 3,204,082 | 8/1965 | Dudko et al. | 219/73.1 |
| 3,466,421 | 9/1969 | Belfor et al. | 219/73.1 |
| 3,510,626 | 5/1970 | Hasegawa | 219/124.33 |
| 3,924,092 | 12/1975 | Lessmann et al. | 219/76.15 |
| 4,017,709 | 4/1977 | Watanabe et al. | 219/126 |

FOREIGN PATENT DOCUMENTS

| | | | |
|---|---|---|---|
| 44-13808 | 6/1969 | Japan | 219/73.1 |
| 1117219 | 6/1968 | United Kingdom | 219/73.1 |

*Primary Examiner*—Thomas J. Kozma
*Assistant Examiner*—Clifford C. Shaw
*Attorney, Agent, or Firm*—Oblon, Fisher, Spivak, McClelland & Maier

[57] ABSTRACT

Disclosed is an automatic welding apparatus for upward welding of curved joints having a plurality of welding nozzles mounted on an arm for independent or separate movement in directions tangent and normal to the welding line, the arm being carried by a column for free vertical and horizontal movement, and a nozzle orientation controlling mechanism adapted to rotate the welding nozzles on the arm to put the welding wire fed from the welding nozzle in parallel with a line tangent to the welding line, upon detecting the inclination of the tangential line.

8 Claims, 18 Drawing Figures

AUTOMATIC WELDING APPARATUS FOR UPWARD WELDING OF CURVED JOINT

This application is a continuation-in-part of Ser. No. 825,068 filed Aug. 16, 1977, now abandoned.

BACKGROUND OF THE INVENTION

1. Field of the Invention

The present invention relates to an automatic welding apparatus for performing an upward electroslag or electrogas arc welding of a structure having curved joints such as arcuate ones, and to a welding controlling method for operating the welding apparatus.

2. Description of the Prior Art

End plates are incorporated in reaction towers and other pressure vessels. The end plates can be easily manufactured unitarily, by means of a fullering making use of a press, if the size of the destined end plate is small enough. However, the end plate of a large size reaction tower or other pressure vessel can hardly be produced unitarily. Thus, conventionally, end plates of large size have been produced by assembling and welding a plurality of sections.

Usually, these sections are a top panel section and a hemispherical section, and the latter is further divided into a plurality of pieces or so-called petals adapted to form, when welded to one another, the hemispherical section of the end plate.

Figures 1, 2:
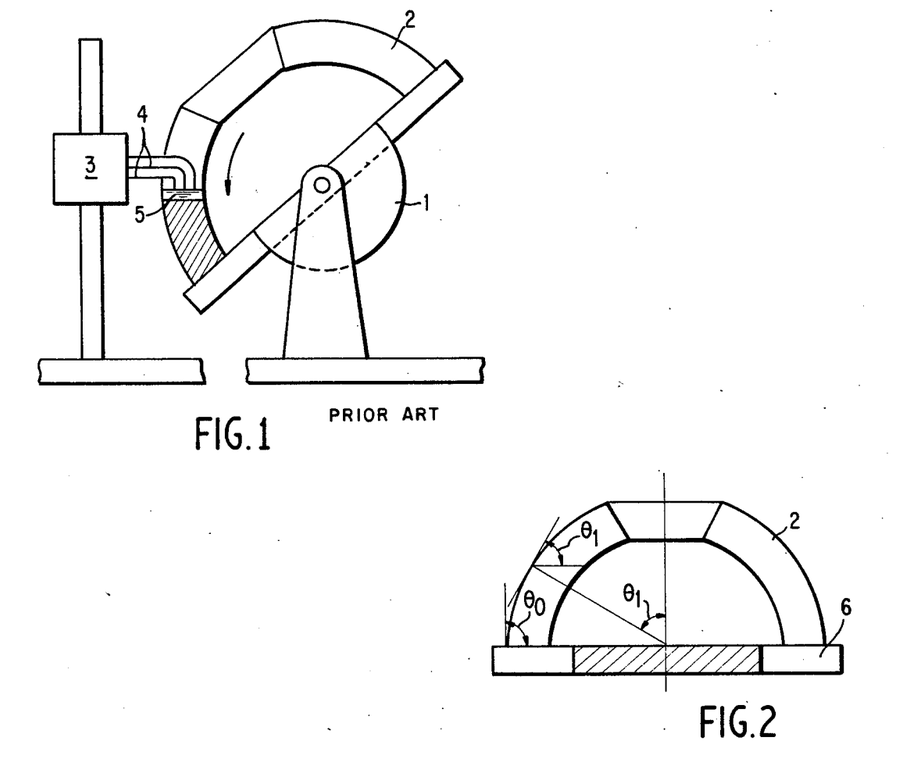
FIG. 1 is an illustration explanatory of a convention method of welding a curved joint.
FIG. 2 is an illustration of an example of a welding object having a curved joint adapted to be welded by the welding apparatus of the invention.

Conventionally, the welding of the petals to form a unitary body has been performed by a method as illustrated in FIG. 1. More specifically, the petal-like pieces to be welded are mounted and fixed on a positioner 1. Then, a plurality of welding nozzles 4, 4 are advanced from an electroslag welder 3 situated at a predetermined position so that the welding nozzles may uniformly cover the groove surfaces. Then, the petal-like pieces are rotated by the positioner, in accordance with the progress of the welding, so as to obtain the molten slag at that position, thus keeping a constant welding posture.

The reason for this rotation of the welded pieces by the positioner, while the welding nozzles are kept stationary, is that the electroslag welding is most conveniently carried out in vertical welding.

However, this conventional method disadvantageously necessitates a specific positioner capable of rotating around the center of the bottom of the hemispherical section. In addition, this method cannot be applied to a conical object. At the same time, when this conventional method is applied to a structure of the aforementioned shape, the scale of the positioner has to be as large as the thickness of the pieces to be welded increases, so that it becomes necessary to uneconomically enlarge the size of the factory house for providing a large space to accommodate the large positioner.

Further, in the conventional method relying upon rotation of the welded pieces by a positioner, for performing the assembling only by vertical welding, there exists a vital drawback in that only one joint can be processed at a time so as to make the efficiency of the work extremely slow. Moreover, a large strain is caused in the final assembly, which can be recovered only through a troublesome step of straightening.

SUMMARY OF THE INVENTION

Under these circumstances, the present invention is aimed at providing an automatic welding apparatus capable of carrying out an improved welding method and a method of controlling the welding apparatus.

It is therefore an object of the invention to provide an automatic welding apparatus capable of performing an upward welding of curved joints without necessitating the movement of the pieces to be welded.

It is another object of the invention to provide a method of controlling the above-noted welding apparatus.

To achieve the above and other objects, according to a first aspect of the invention, there is provided an automatic welding apparatus for performing upward welding of curved joints comprising a plurality of welding nozzles mounted on an arm for free independent movement in directions tangent and normal to the welding line, the arm being carried by a column for free vertical and horizontal movement, and a nozzle orientation controlling mechanism adapted to rotate the welding nozzles on the arm, so as to put the welding wire fed from the welding nozzle in parallel with the line tangent to the welding line, upon detecting the inclination of the tangential line.

According to another aspect of the invention, there is provided an automatic upward welding method comprising lifting an arm carrying a plurality of welding torches and mounted on a column for free vertical and horizontal movement in such a manner that the extension of wire of the welding torch closest to the surface of the welding object is kept constant, so as to detect the inclination of the line tangent to the welding line by the end of the arm, tilting the welding nozzle so as to bring the welding wire in parallel with the tangential line, calculating the welding breadth from the inclination of the tangential line at the welding portion, the outer diameter of the welding object, and the thickness of the welding object, calculating and optimizing the space between the welding nozzles, the number of the welding nozzles and the amplitude of the swing of a plurality of nozzles in accordance with a condition based upon the calculated welding breadth, and welding the object while calculating and optimizing the extensions of respective welding torches.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Hereinafter, preferred embodiments of the invention will be described with specific reference to the attached drawings.

Referring to FIG. 2 showing a welding object 2 having butt joints of petal-like pieces for forming an end plate of a large-sized pressure vessel, the welding object is situated on working stool 6 with its hemispherical or conical base fixed to the horizontal surface of the stool 6. At the beginning of the welding, the welding is performed in the same manner as the conventional welding, so that the surface of the welding object (in this method, the surface is substituted by a line tangent to the surface, because the welding object has a spherical surface) forms a right angle to the surface of the molten pool or the molten slag. However, the angle $\theta$ formed between the tangential line and the surface of the molten slag is changed in the same manner as the central axis, in accordance with the progress of the welding.

Figure 3:
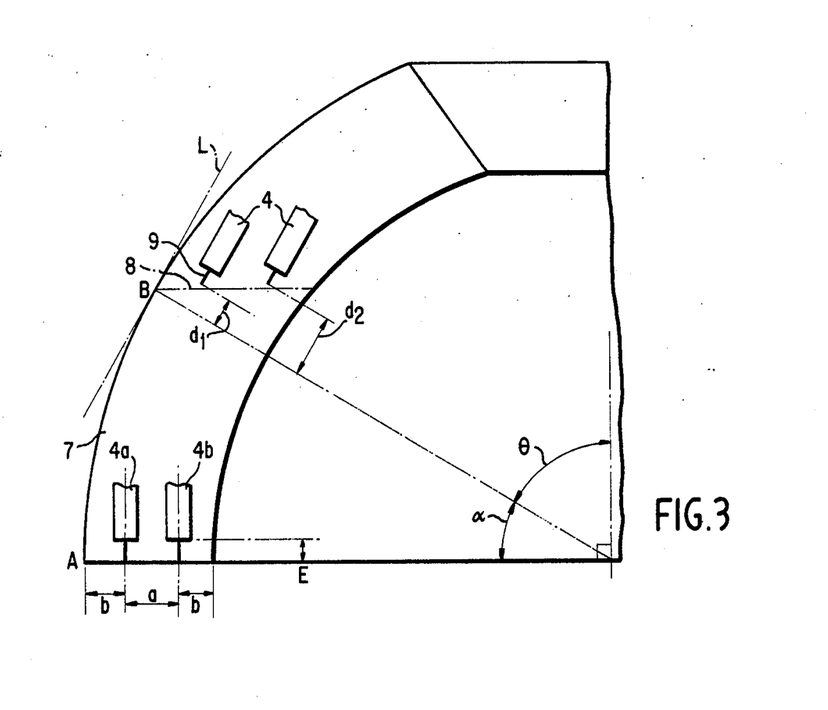
FIG. 3 is an illustration explanatory of the welding method in accordance with the invention.

In this case, in order to obtain a sound bead form having a sufficient reinforcement of weld, it is necessary to keep the tangential line L of the welded surface, at the point where the surface 8 of the molten slag and the welded surface 7, in parallel with the end of the welding wire 9, as well as to keep the distance E between the end of the welding nozzle 4 and the molten slag surface 8, i.e. the extension E, constant as shown in FIG. 3.

For instance, considering welding nozzles 4a and 4b as shown in FIG. 3, comparing the state in which the molten slag surface is located at a position A ($\theta_0 = 90°$, starting of the welding) with the state in which the welding has been advanced by a center angle of $\alpha°$ to position the molten slag surface at position B ($\theta_1 = 90° - \alpha°$), it will be seen that the ends of welding wires of both welding nozzles 4a, 4b have been inclined by an angle $\alpha$, and the nozzles 4a and 4b have been lifted substantially in parallel with the line tangent to the welding line, by a distance $d_1 = b/\tan \theta$ and $d_2 = (a+b)/\tan \theta$, respectively.

Concerning the distance between the nozzled 4a and 4b, the distance has been changed from a to a/sin $\theta$, as the welding has been advanced from the state of position A to the state of position B. Thus, the distance has become two times as large as that of the original distance, supposing that the angle $\theta$ is 30°. Thus, in order to practically carry out the welding, it is necessary to suitably correct the distance between the electrodes in accordance with the progress of the welding. More specifically, an adjustment is necessary in the direction substantially normal to the welding tangential line, for correcting the distance between the electrodes, as well as in the direction substantially in parallel with the welding tangential line, for maintaining the distance or extension E constant in accordance with the welding conditions.

At the same time, the shifting of the position of the welding nozzle becomes necessary, because of the breadth of the molten slag surface has become large.

The automatic welding apparatus can fairly cope with the above stated requirements, as will be seen from the following description.

Figure 4:
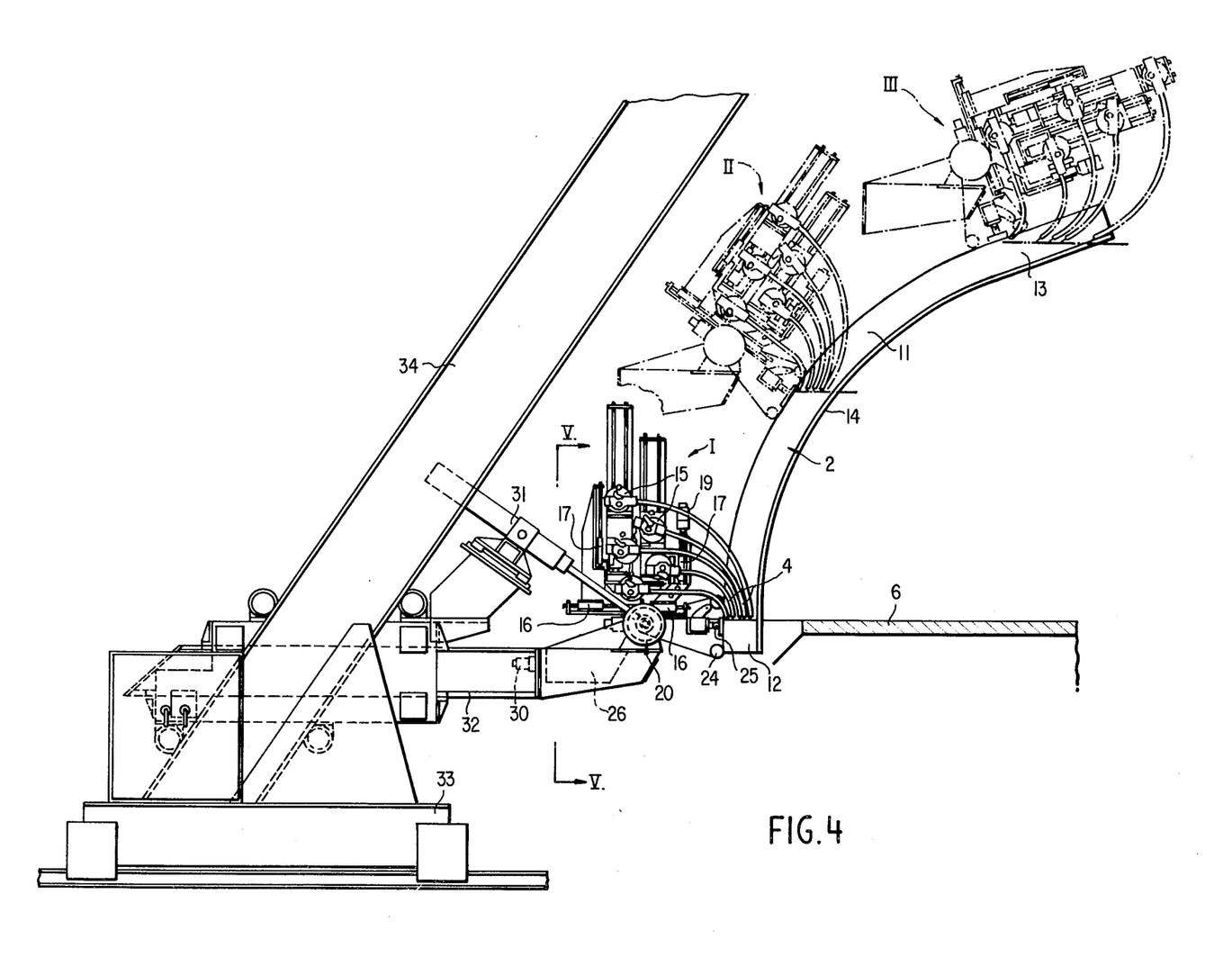
FIG. 4 is a schematic front elevational view of an embodiment of the automatic welding apparatus of the invention.
Figure 5:
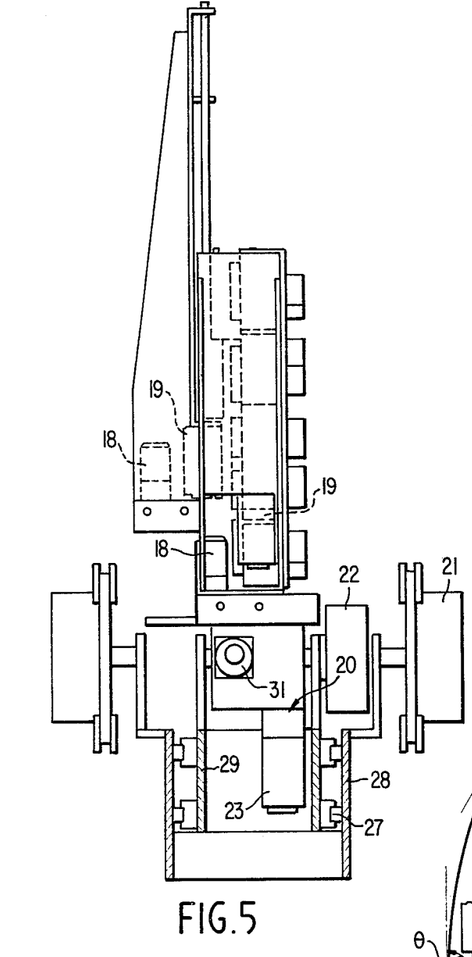
FIG. 5 is a sectional view taken along the line V—V of FIG. 4.

FIGS. 4 and 5 show an automatic welding apparatus in accordance with the invention, for performing a welding of petal-like pieces for constituting an end plate having a wall thickness of 200 mm, outer radius of 2400 mm, and an angle of inclination of $\theta = 20°$. Since the breadth of the molten slag surface becomes finally as large as 600 mm, the apparatus is provided with 5 (five) electrodes.

Reference numerals 11, 12, 13 and 14 denote, respectively, a groove surface of the petal-like pieces, a tab plate at the starting end, a tab plate at the terminal end and the fixing steel plate at the back side. The petal-like piece 2 is fixed to the horizontal surface of a stool 6. Welding nozzles 4, 4 . . . and the welding wire feeding mechanisms 15, 15 . . . are secured unitarily to each other, by means of bolts, at socket portions, and are mounted on first nozzle shifting mechanisms 16, 16 . . . adapted to cause a movement of the welding nozzles in the direction substantially normal to the welding tangential line, and on second nozzle shifting mechanisms 17, 17 . . . for performing the shifting of the nozzles in the direction substantially in parallel with the welding tangential line. The second nozzle shifting mechanism may be mounted on the first nozzle shifting mechanism 16, 16 as shown in the Figures, or, alternatively, the nozzle shifting mechanisms may be assembled such that the first nozzle shifting mechanism is mounted on the second nozzle shifting mechanism.

These nozzle shifting mechanisms 16, 16 and 17, 17 incorporate motors 18-1; 18-2; etc. and 19-1; 19-2; etc., respectively. These parts are mounted on a wire-end orientating mechanism 20 adapted to orientate the end of the welding wire substantially in parallel with the welding tangential line. The welding nozzle 4, 4, wire feeding mechanism 15, 15, first nozzle shifting mechanism 16, 16 and the second nozzle shifting mechanism 17, 17 are as a whole rotated by the wire-end orientating mechanism 20 for the control of the welding posture. Although the wire feeding mechanism is mounted on the wire-end orientating mechanism 20 in the described embodiment, the feeding mechanism can be installed separately for reducing the size of the head portion.

Figure 9:
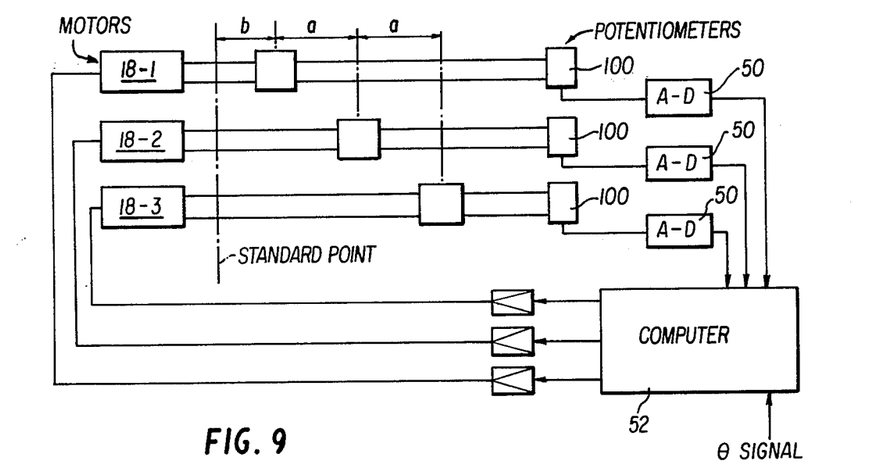
FIGS. 9 and 10 show control circuits for nozzle shifting mechanisms.
Figure 10:
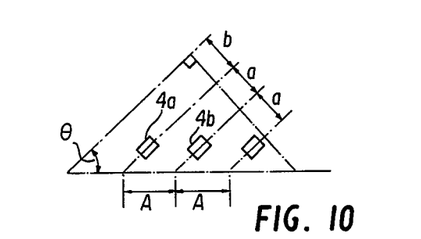

The control of the motor 18-1; 18-2; 18-3, etc. (for first nozzle shifting mechanism 16) is as follows. First, as shown in FIGS. 9 and 10, distance "A" between the electrodes is determined based upon welding conditions and distance "b" on the first nozzle shifting mechanism 16 is also determined on the welding conditions. Based upon a value corresponding to the angle $\theta$ obtained by synchro transmitter 21, sin $\theta$ can be computed. Distance "a" between electrodes on the first nozzle shifting mechanism is computed as follows:

$a = A \sin \theta.$

Then, the positions of respective electrodes 4a, 4b, etc. are computed as follows:

No. 1 electrode (4a) b
No. 2 electrode (4b) b+a
No. 3 electrode (etc.) b+2a
No. 4 electrode (etc.) b+3a
No. 5 electrode (etc.) b+4a The same number of motors 18-n as the number of electrodes are provided wherein FIG. 5 illustrates two of five motors utilized in the preferred embodiment.

Potentiometers 100 detect the position of each slide bed 42 and signals from the potentiometers are A-D converted (analogue-digital conversion) by converters 50 and entered to an automatic calculator or computer 52. By comparing detected positional signals with the computed values, respective positions of the electrodes are thus compensated for.

Figure 11:
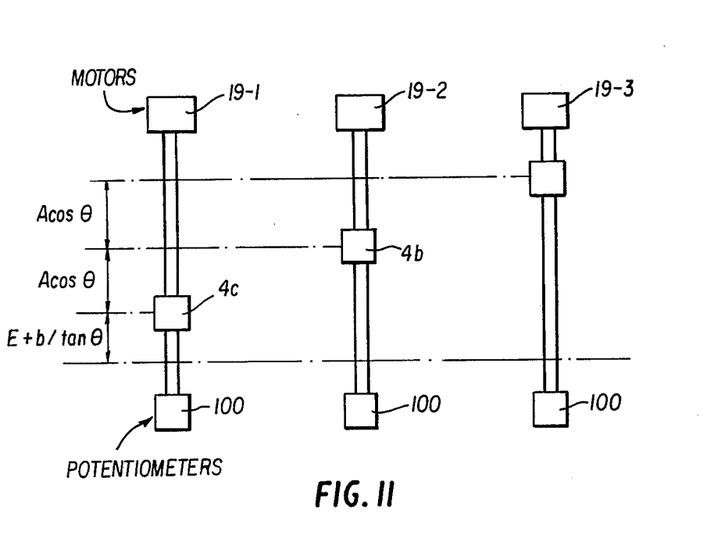

With regard to the motors 19-1; 19-2, etc. (for second nozzle shifting mechanism 17) first, as shown in FIG. 11, extension "E" distance "A" between electrodes, distance "b" between the base metal surface and the outermost or innermost electrode are predetermined in view of the welding conditions. The angle $\theta$ of the synchro transmitter 21 is read with the positions of respective electrodes being computed as follows:

No. 1 electrode (4a) $E + d_1 = E + b/\tan \theta$
No. 2 electrode (4b) $E + d_2 = E + b/\tan \theta + A \cos \theta$
No. 3 electrode (etc) $E + d_3 = E + b/\tan \theta + 2A \cos \theta$
etc.        etc.

The same number of motors 19-1; 19-2; 19-3, etc. as the number of electrodes are provided with FIG. 5 illustrating two motors of the total of five.

Potentiometers 100 detect positions of respective slide beds 42 and signals from such potentiometers are A-D converted as discussed above and input into the computer. Comparing detected positional signals with the computed values, the positions of respective electrodes are thus compensated for by the mechanism shown in FIG. 6.

To explain in more detail, the wire-end orientating mechanism 20 has a synchro-transmitter 21, as shown in FIG. 5, a synchro-receiver (synchro-control transformer) 22 and a driving servo motor 23. The arrangement is such that the stator circuit of the control transformer is connected to that of the transmitter, so that the angular difference between the stators are taken out as an electric potential corresponding to the angular distance. The electric potential is then applied to a servo amplifier for actuating a servo motor.

Alternatively, the wire-end orientating mechanism can be constructed such that the head portion incorporating the first and the second nozzle shifting mechanism as a whole is attached to an arcuate guide centered at a point where the objective welding surface meets the molten slag surface, so that the wire-end orientating mechanism 20 may be rotated around the above defined point. In this case, the original point for the movement (swinging) of the welding nozzle can be maintained substantially fixed on the apparatus, and the calculation and correction of the length of movement (swinging) can conveniently be facilitated.

As mentioned before, for actually carrying out the welding, it is necessary to move the welding nozzles, so that the portion for detecting the angle $\theta$ and the moving portion must be separated from each other.

In the embodiment under description, a synchro transmitter 21 which constitutes the portion for detecting the angle $\theta$ is attached to a frame on which mounted also are a copying wheel 24 on the objective welding surface and a mechanism 25 for pressing a slidable steel or copper plate onto the objective welding surface. This frame constitutes an outer frame 28 for a guide portion 27 of an oscillating mechanism 26, while the synchro receiver 22 and its rotatable portion constituting the oscillatable portion forms an inner frame 29 for the guide portion 27 of the oscillating mechanism 26.

A driving motor 30 is mounted on the outer frame 28, and is connected to the inner frame 29 through a screw (not shown). Namely the rotary motion of the motor shaft is converted into a linear movement by means of the screw.

Figure 12:
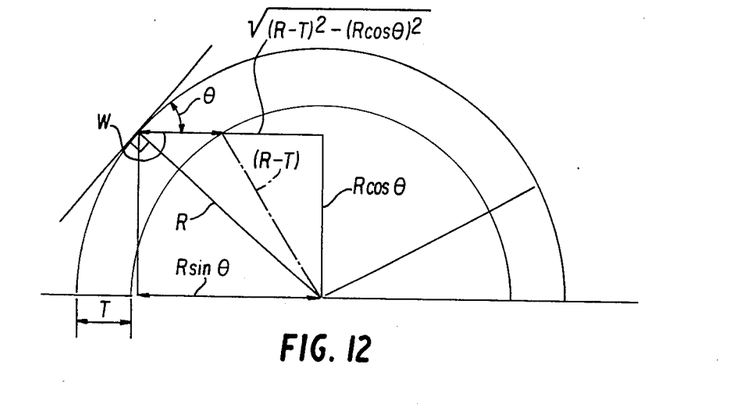
FIGS. 12 and 13 show the dimensional relationships of the nozzles of the present invention.

With regard to oscillating mechanism 26, provided that the thickness of the material to be welded is "T", if the angle is $\theta$, the width of molten pool "W" is determined as follows:

$$W = R \sin \theta - \sqrt{(R - T)^2 - (R \cos \theta)^2}$$

where R is the outer diameter of the material to be welded as shown in FIG. 12. Distance "A" between electrodes on the molten metal surface is predetermined depending upon welding conditions.

Figure 13:
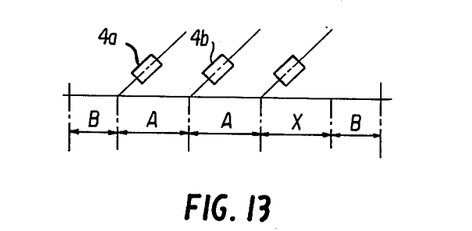
Figure 14:
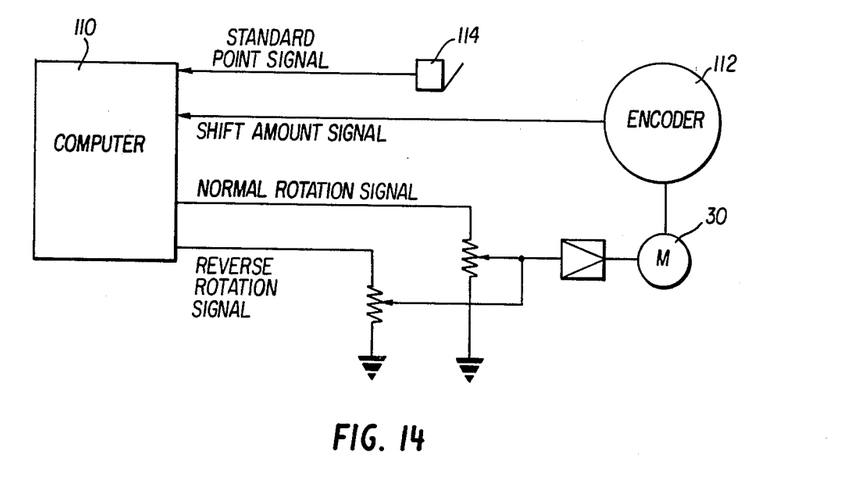
FIGS. 14 and 15 show the oscillating mechanism elements of the present invention.
Figure 15:
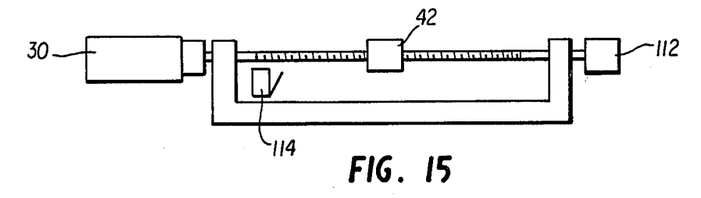

As shown in FIGS. 13–15, if the number of electrodes is N, the distance "B" between the surface of the member to be welded and the outermost or innermost electrode on the molten metal surface is $B = b/\sin \theta$ (where b is predetermined).

Accordingly, necessary oscillation with "X" can be calculated according to the following equation:

$X = W - 2B - (N-1)A.$

Computer 110 generates a signal of normal rotation of motor 30. The shift amount of slide bed 42 is input to the computer 110 from rotary encoder 112 and, if the amount corresponds to the calculated value "X", motor 30 stops its rotation. After a predetermined period of stopping, the computer generates a reverse rotation signal and motor 30 rotates in a reverse direction until standard limit switch 114 is actuated.

When the standard limit switch 114 is actuated, the computer keeps the motor 30 stopped for a predetermined period of time. At the same time, such calculates a new oscillation with "X". After a predetermined period of stopping the electrodes start to oscillate. When the slide bed 42 actuates the standard point limit switch 114, the first electrode is located at a point "b" (i.e. "B" on the molten metal surface) apart from the surface of the member to be welded.

A head pressing mechanism 31 is constituted by an electrically actuated cylinder incorporating a constant pressure pressing mechanism, and is adapted to press the outer frame 28 of the oscillation guide portion 27, so as to press the pressing mechanism 25 for the slidable plate and the copying wheel 24 onto the objective welding surface, as well as to move the arm or head boom 32 carrying the whole apparatus back and forth in accordance with the shape of the objective surface.

The arm or head boom 32 carries the whole apparatus including the oscillating mechanism, and is incorporated in an obliquely going manipulator 33 for ascending in accordance with the progress of the welding.

The head pressing mechanism incorporating the electrically actuated cylinder is not exclusive, and the head can be pressed onto the objective welding surface by other means. For instance, the copying wheel 24 may constitute a magnet roller, so that the head may be attached slidably to the objective welding surface, and the slidable steel or copper plate may be pressed onto the objective surface by means of a spring or the like.

Alternatively, the copying wheel and the slidable plate may be pressed onto the objective surface by means of ropes stretched in parallel with the groove.

Hereinafter, an example of operation of this embodiment will be described.

In FIG. 4, symbol I represents the state of starting of the welding, i.e. that state in which the angle $\theta$ is 90°. Symbols II and III represent the states in which the angle $\theta$ are 55° and 20°, respectively.

As the welding is started from the condition of I, the level of the molten slag ascends gradually as the wire is fed, so that the head boom 32 is raised correspondingly. For performing this raising of the head boom 32, several methods have been proposed up to now. For example, according to a conventional method, the level of the molten slag surface is detected by means of a temperature detector or an insulated electrode embedded in the slidable copper plate. According to another conventional method, the change in welding current, voltage or wire feeding speed is detected as representative of the change in the extension of the wire and for detecting the ascent of the level of molten slag surface. In still another method, the number of revolutions of the wire feeding roller is counted, and the total input amount of metal is calculated from the counted number of revolutions of the wire feeding roller. Then, the ascent of the molten slag surface is detected from the change in $\theta$.

These conventional methods can fairly be adopted in the embodiment now described.

In the present specification, the description will be made supposing that the arm or head boom 32 is automatically raised, by applying the detecting method relying upon the detection of change in welding current as representative of the change in extension, to respective welding nozzles.

As the arm or head boom 32 goes upwardly along the column 34 of the oblique-going type manipulator 33, the copying wheel 24 and the slidable steel or copper plate are pressed onto the objective mechanism 31, so that the ascent of the head boom is made copying the objective surface.

In this state, as the synchro transmitter 21 detects the change in $\theta$, an electric potential or voltage is generated in accordance with the angular differential between the stators of the transmitter 21 and the synchro receiver 22, because the stator circuits thereof are electrically connected to each other. Then, a controller supplied with this electric potential energizes the servo motor 23 to negate the electric potential, i.e. to negate the angular differential between the transmitter and the receiver. Consequently, the welding nozzles 4, 4 . . . , wire feeding means, 15, first nozzle shifting mechanisms 16, 16 and the second nozzle shifting mechanisms 17, 17 as a whole are rotated by the angle corresponding to the change in the angle $\theta$ so as to bring the ends of the welding wires in parallel with the tangential lines at the welding points.

Figure 16:
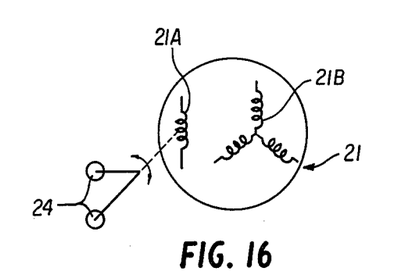
FIGS. 16–18 illustrate the circuitry for the oscillating mechanism of the present invention.
Figure 17:
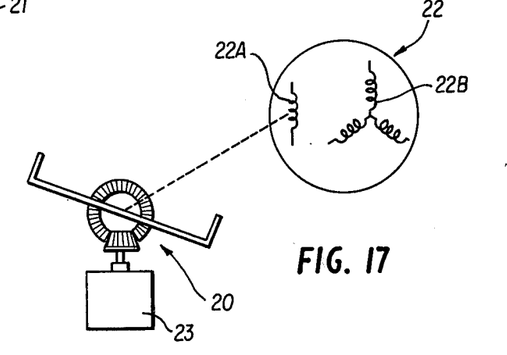
Figure 18:
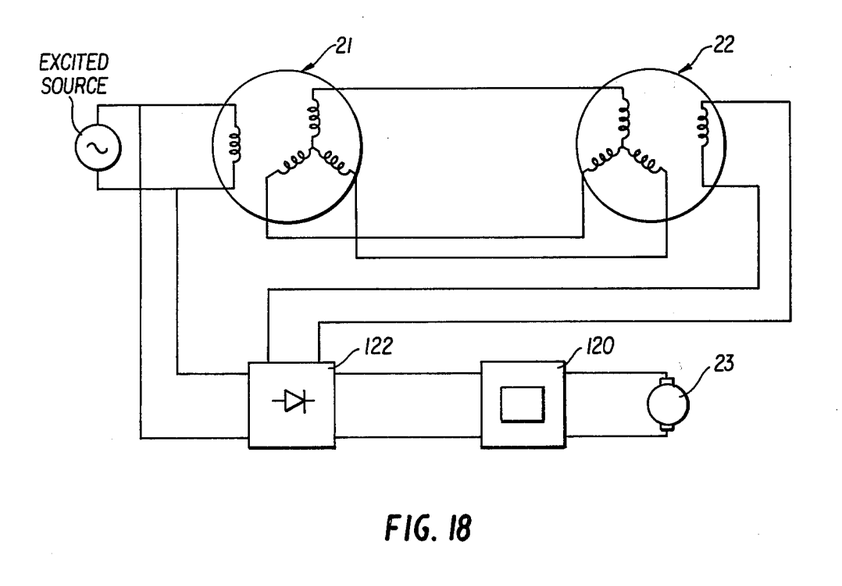

Control of servo motor 23 (for wire end orientating mechanism 20) is, as shown in FIGS. 16–18, accomplished as follows: As noted hereinabove, synchro transmitter 21 and synchro receiver 22 are mounted on a frame. An electric potential or voltage which corresponds to the rotation angle of primary rotor 21A of synchro transmitter 21 connected to rotation axis of copying wheel 24 is generated as secondary stator 21B of synchro transmitter 21. This electric potential or voltage is applied to primary stator 22B of synchro receiver 22. At a secondary rotor 22A of the synchro receiver 22 which is connected to the axis of orientating mechanism 20 rotated by servo motor 23, the electric potential or voltage corresponding to angular difference between primary rotor 21A of synchro transmitter 21 and synchro receiver 22 is applied via synchro rectifier circuitry 122 to servo amplifier 120 to drive servo motor 23 which changes angle of orientating mechanism 20, and secondary rotor 22A of synchro receiver 22 rotates accordingly. If the angle of primary rotor 21A of synchro transmitter is identical to that of secondary rotor 22A of synchro receiver 22 (i.e. no angular difference) servo motor 23 stops.

By the above-noted actions, first nozzle shifting mechanism 16 is kept perpendicular to the surface of the members to be welded and second shifting mechanisms 17 is kept parallel to the tangential surface of the members to be welded.

The above stated controlling method is not exclusive and other methods can be adopted for performing the control. For instance, a combination of a rotary encoder and a pulse motor or a stepping motor can be advantageously used. Alternatively, the control may be performed in such a manner that the portion for detecting the angle $\theta$ solely copies the objective welding surface to memorize the manner of change of the position of the surface, and then a separate portion is controlled by the servo motor to perform the correct welding in accordance with the memorized information.

As the ends of the welding wires are controlled to become parallel with the tangential line, then each of the welding nozzles has to be moved in a direction substantially normal and parallel to the line tangent to the welding line, as has been described in connection with FIG. 3.

Figure 6:
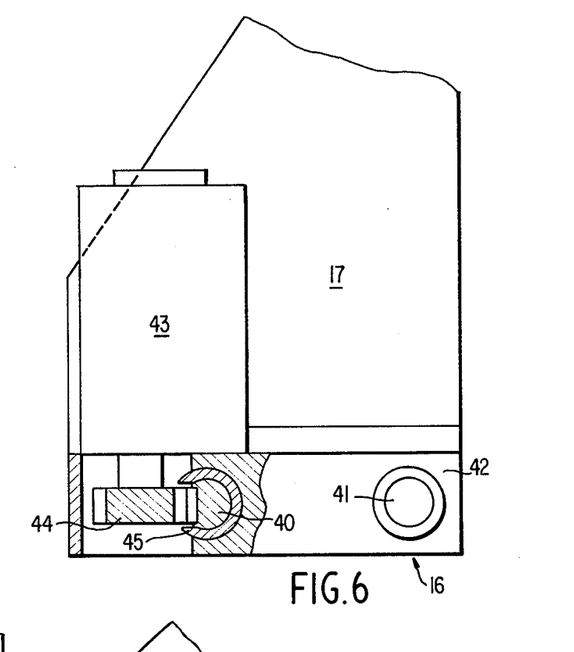
FIG. 6 is a front elevational view of a shifting mechanism incorporated in the apparatus of FIG. 4.

This locating function is performed by the first nozzle shifting mechanisms 16, 16 . . . and the second nozzle shifting mechanisms 17, 17 . . . which are mounted on the orientating mechanism 20. The combinations of the first and the second nozzle shifting mechanisms are so arranged for respective nozzles that the second nozzle shifting mechanism is mounted on the first nozzle shifting mechanism in each combination. These mechanisms are constituted, as shown in FIG. 6, by two linear guide bars 40, 41, a slide bed 42 adapted to slide along the guide bars 40, 41, a driving motor and its gear head 43, and a driving pinion 44. Guide bar 40 is provided with a rack 45 for meshing with the driving pinion 44.

The above described construction is not exclusive, and the motor and the gear head may be fixed to the stationary side, but not to be slide bed, for driving a screw feeding mechanism such as a ball screw, in order to dimish the play.

In case that the second shifting mechanism 17 is mounted on the first shifting mechanism, it is possible to mount a plurality of slide beds on a common pair of guide bars. To this end, it is necessary to calculate the travel distances of the slide beds, and to preserve a sufficient space between the adjacent slide beds.

In case that the first shifting mechanism is mounted on the second shifting mechanism, the slide beds of a plurality of second shifting mechanism can be carried by a common pair of guide bars.

The control of the first shifting mechanism is performed in the following manner.

At first, the change of $\theta$ or the value of $\theta$ is detected from synchro transmitter 21 (or a rotary encoder) of the orientating mechanism 20. Then, the distance between the adjacent electrodes on the molten slag surface, which depends on the welding condition at that instant, is input and multiplied by sin $\theta$, for calculating the distance between the electrodes on the orientating mechanism 20, to thereby determine the positions of slide beds of respective nozzles.

Thus, the first shifting mechanism is provided with a scale for positioning the slide beds. This scale may be constituted by a combination of a pulse motor or a stepping motor, which also plays the role of the driving motor, and a memorizing counter circuit. Also, a combination of a magne-scale and a memorizing counter, or a combination of a potentiometer connected to the driving pinion shaft and a limit switch may be used as the scale.

At the same time, the difference between the electrode distance on the molten slag surface and the number of nozzles, and the breadth of the molten slag surface is calculated from the value of $\theta$, and is compensated or corrected by the oscillating mechanism 26.

In the described embodiment, the positions of slide beds of the nozzles are changed in accordance with the change of the angle $\theta$, so that the distance between the slide bed corresponds to the electrode distance on the molten slag surface which depends on the welding condition, as the welding progresses upwardly.

Alternatively, such a control is adaptable such that the angle range $\theta$ is divided into a plurality of zones and the positions of the slide beds are fixed during the angle $\theta$ changes within a zone.

At the same time, the positions of the slide beds can be controlled in such a manner that they are shifted when the electrode distance on the molten slag surface comes to exceed a predetermined maximum allowable distance.

It is still possible to control the positions of slide beds, such that the portion for measuring the angle $\theta$ and breadth of molten slag surface is separated from the welding portion, and the separated measuring portion copies the objective welding surface in advance to the welding. Then the positions of the slide beds are controlled, in the course of welding which is made in accordance with the memorized information obtained from the measuring portion.

The control of the second shifting mechanism aims, as has been explainted in connection with FIG. 3, at maintaining the extension of the welding wire in accordance with the welding condition.

In the present embodiment, the change in the welding current is detected as the parameter of the change in the extension, as is the case of the control for automatically raising the head boom 32, and the positions of the slide beds for respective welding nozzles are controlled so as to negate the change in the welding current.

The control of the extension can be made also by the same method as the aforementioned automatic raising of the head boom.

It is also possible to determine the positions of the slide beds of the second shifting mechanism by a calculation based on the value of the angle $\theta$ at the instant and the positions of the slide beds of the first shifting mechanism.

Alternatively, the portion for measuring the angle $\theta$ and other data copies the objective welding surface to memorize the necessary information and then the positions of the slide beds are controlled in the course of the welding, in accordance with the memorized information.

The welding apparatus thus gradually performs the welding As noted earlier, symbol II denotes the apparatus which has performed the welding to the position where the angle $\theta$ is 55°.

It will be seen from the foregoing description that the second shifting mechanism can be dispensed with when the apparatus incorporates only one welding nozzle, because the automatic raising of the head boom provides the same control In such a case, the first shifting mechanism may be constructed to play also the role of the oscillating mechanism. However, if the starting or stopping position of the oscillating mechanism is to be adjusted, it is necessary to provide the first shifting means and the oscillating mechanism separately.

In the described embodiment, the first and the second shifting mechanisms are combined in such a manner that the second mechanism is carried by the first mechanism, because of convenience in disposing a large number of welding nozzles. However, when the number of welding nozzles is small, the first mechanism can be mounted on the second mechanism.

When an orientating mechanism is mounted on the second shifting mechanism of this embodiment, for example, an advantageous effect is brought about in that the orientation or posture of the individual welding nozzle can be performed minutely, although a certain degree of troublesome work is required for avoiding the mutual contact of the large number of welding nozzles. In such a case, no practical inconvenience would be caused by neglecting the orientating mechanism under the first shifting mechanism. Further, it is possible to mount the orientating mechanism which rotates around the arc point. In such a case, although the apparatus is large for accomodating a large arcuate guide or a link mechanism to allow the rotation of the orientating mechanism around the arc point, the orientation of posture of each welding nozzle can be performed finely and the mutual contact of the welding nozzles is completely avoided.

It will be seen that the original point of oscillation is fixed, and the calculation for correction is facilitated and simplified, by rotating the welding head as a whole around the point at which the objective welding surface intersects the molten slag surface.

Figure 8:
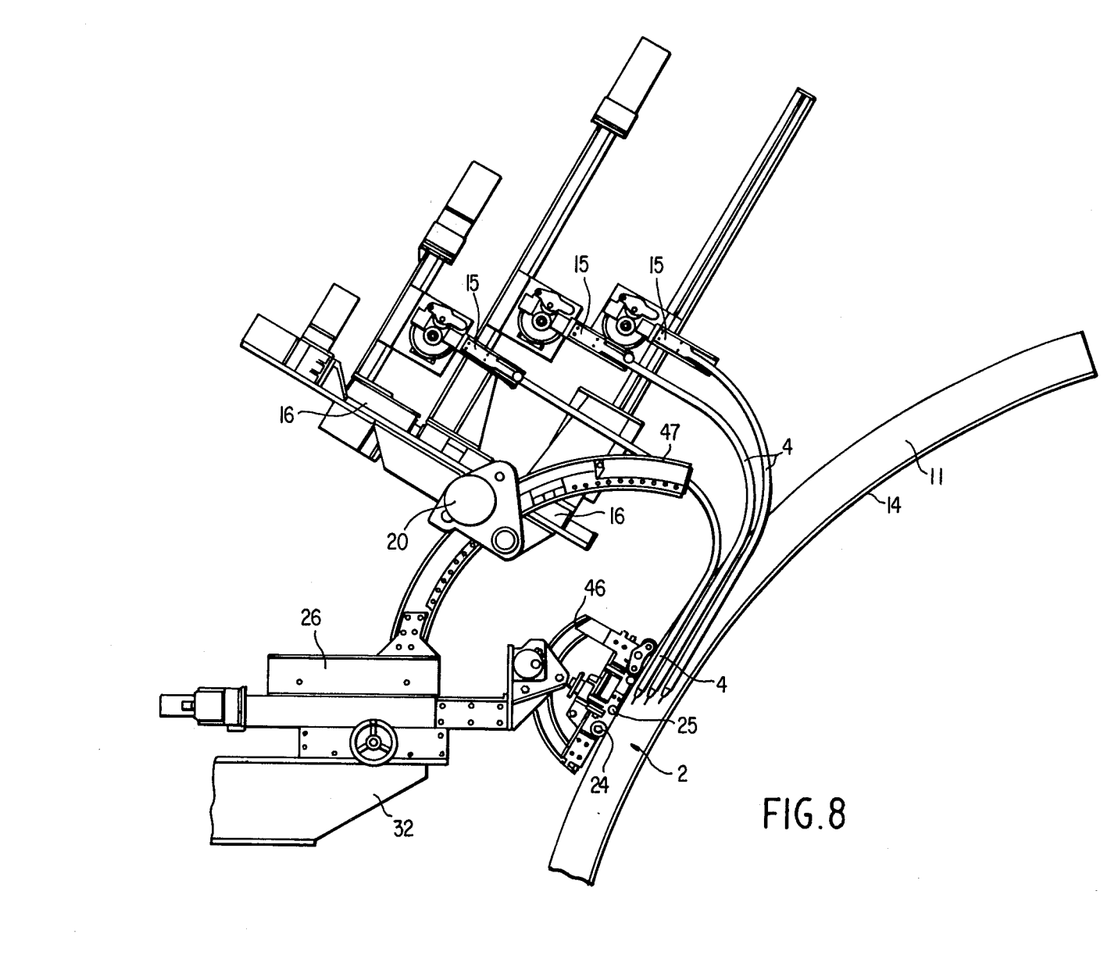
FIG. 8 is a schematic front elevational view of another embodiment of the invention.

For instance, FIG. 8 shows an embodiment which is adapted to be rotated around the point where the objective welding surface meets the molten slag surface, and in which arcuate guides 46, 47 are provided for constituting the means for detecting the welding tangential line and a mechanism for controlling the orientation of the welding nozzle.

Although the invention has been described with specific reference to an embodiment designed for performing a butt welding of a hemispherical or bowl-like object, it is, of course, possible to apply the invention in an oblique upward welding for a conical object.

As has been described, when the apparatus of the invention is applied to an upward welding of a hemispherical or conical object such as an end plate of a large pressure vessel, with the bottom (the end of the larger diameter) placed on a horizontal surface of a stool or the like, the welding is performed automatically, without using a specific positioner adapted for rotation around the center of the bottom of the hemispherical body or a large positioner.

In addition, the working efficiency is much improved because more than two joints are welded at a time.

Further, by performing the welding at more than two points, the residual strain in the final welded structure can be advantageously reduced.

Hereinafter, a second example of operation of the welding apparatus will be described.

Figure 7:
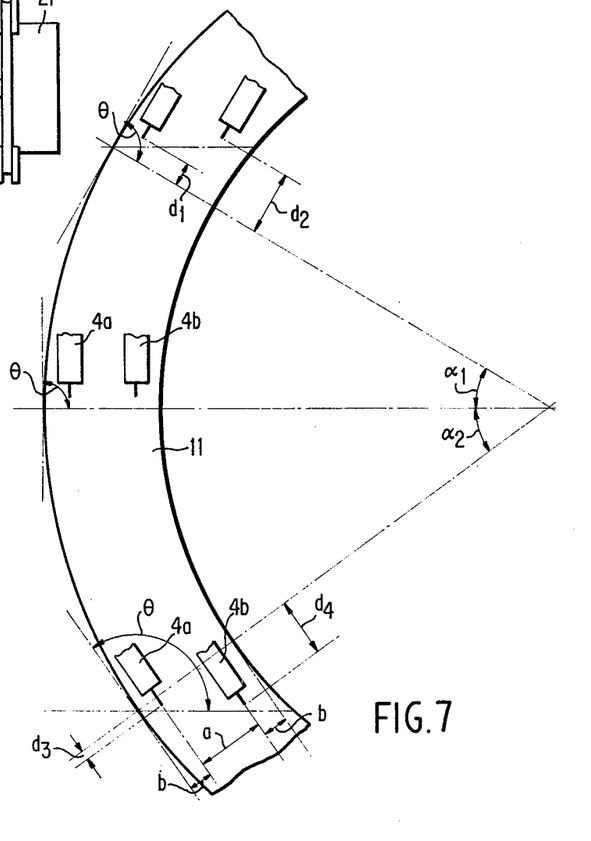
FIG. 7 is an illustration explanatory of another welding method performed by the welding apparatus of the invention.

FIG. 7 illustrates welding of an end plate constituting petal-like pieces. The himispherical or conical portion of the end plate is placed on a conventional positioner or a specific column, with its bottom (the side of the larger diameter) directed downwardly. The end plate petal has a thickness of 200 mm, outer radius of 2400 mm, and an angle of inclination ($\theta$) of 20°, as is in the foregoing embodiment. The welding is performed in the form of a vertical welding, keeping the bisector line of the center angle of the petal horizontal. In this case, the center angle is supposed to be 70°, so that the symmetry center angle is ±35° since the bisector line is kept horizontal. The maximum breadth of the molten slag surface is about 350 mm, which is smaller than that of the foregoing embodiment. Accordingly, the number of the welding nozzles can be reduced.

In the embodiment now described, it is necessary to incorporate a positioner or a specific column for keeping the aforementioned bisector horizontal, having a size which increases in accordance with the size of the welding object. However, such an inconvenience is completely compensated for by the advantages that the center angle is reduced to a half, because it is divided into plus and minus at the horizontal plane, and that the maximum breadth of the molten slag surface is reduced to about 3/5, which in combination afford less severe reguisites for the number of welding nozzles, welding conditions, and controlling conditions of the apparatus.

The construction of this embodiment is the same as that of the foregoing embodiment, except that the number of the welding nozzles is reduced and that the manipulator is a conventional vertical type instead of the oblique type. At the same time, the manner of operation is identical to that of the first embodiment as far as the angle $\theta$ is between 90° and 55°. However, this embodiment differs from the foregoing first embodiment in the stroke of the second nozzle shifting mechanism and the arrangement of the slide beds of that mechanism. Namely, in this embodiment, the welding is started from the state of $\theta$ being 125°, and is completed at the state of $\theta$ being 55°, via the state of $\theta$ being 90°, so that the stroke of the second shifting mechanism and the arrangement of the slide beds of the latter must be selected taking the stroke corresponding to the angle range of $\theta$ of between 125° and 90° into account.

FIG. 7 shows exemplarily two electrodes $4a$ and $4b$. In case that the bisector of center angle of the hemispherical welding object is kept horizontal, if the molten slag surface is below the level of the bisector, i.e. if the angle $\theta$ is smaller than 90°, the electrodes $4a$ and $4b$ have to be lifted substantially in parallel with the welding tangential line, by $d_3 = b \tan(\theta - 90°)$ and $d_4 = (a+b) \tan(\theta - 90°)$, respectively.

Therefore, the slide beds are so disposed as to make it possible to further lower the slide beds and welding nozzles even at the state of $\theta = 90°$, for ensuring the strokes corresponding to $d_3$ and $d_4$ in FIG. 7, in good contrast to the case of the foregoing embodiment in which the slide beds of the second nozzle shifting mechanism are so disposed that there remains no stroke for lowering the slide beds when the angle $\theta$ has come to be 90°.

The first nozzle shifting mechanism is intended for adjusting the distance between the electrodes do meet the welding condition. A symmetrical operation around the position of $\theta$ being 90° is performed by the first shifting mechanism, because $a/\cos(\theta - 90°)$ is equal to $a/\sin\theta$, for the symmetrical positions of the molten slag surface across the position of $\theta$ being 90°, i.e. when the angles $\alpha_1$ and $\alpha_2$ are equal to each other in FIG. 7. Therefore, the first mechanism of this embodiment may be operated in the same manner as the foregoing embodiment.

Obviously many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An automatic welding apparatus for performing an upward welding of a curved joint of an object along a welding line of said object including an arm carried by a column for free vertical and horizontal movements, which comprises:
   a plurality of welding nozzles each provided with welding wires and mounted on said arm;
   means connected to said arm for adjusting the distance between said welding nozzles and for movement of said welding nozzles in directions in parallel with and normal to a line tangent to said welding line, independently of each other;
   means connected to said arm for detecting inclination of said line tangent to said welding line at a welding point; and
   a nozzle orientating mechanism connected to said arm and adapted to rotate said nozzles in accordance with said inclination detected by said detecting means, so as to orient said welding wire fed from said welding nozzles in parallel with said line tangent to said welding line.

2. An automatic welding apparatus as set forth in claim 1 which further comprises:
   a nozzle shifting means mounted on said arm for moving said welding nozzles in a direction substantially normal to said line tangent to said welding line.

3. An automatic welding apparatus as set forth in claim 1, which further comprises:
   a welding wire feeding mechanism operably connected to said arm for feeding said welding wire to said welding nozzles.

4. An automatic welding apparatus as set forth in claim 2 which further comprises:
   a welding wire feeding mechanism operably connected to said arm for feeding said welding wire to said welding nozzles.

5. An automatic welding apparatus as set forth in claim 4 wherein said feeding mechanism is secured unitarily to said welding nozzles.

6. An automatic welding apparatus as set forth in claim 4 which further comprises:
   a wire-end orienting mechanism for orienting the ends of said welding wires substantially parallel with said line tangent to said welding line wherein said welding nozzles, said wire feeding mechanism, said nozzle shifting means and said nozzle orienting mechanism are as a whole rotated by said wire-end orienting mechanism for control of welding posture.

7. A method of controlling an upward welding along a welding line of a curved joint of an object utilizing an arm carried by a column for free vertical and horizontal movement and provided with a plurality of welding nozzles with welding wires at its end comprising:

lifting said arm so as to orient extension of said welding wires of said welding nozzles adjacent to a welding surface of said object;

detecting the inclination of a line tangent to said welding line at a welding point adjacent said end of said arm;

tilting said welding nozzles so that said welding wires are parallel with said welding line;

adjusting the distance between said welding nozzles on said welding surface, the number of said welding nozzles and the oscillation amplitudes of said welding nozzles from conditions based upon the breadth of said welding surface for forming a sound weld bead form having a predetermined reinforcement of weld, said breadth being calculated from said inclination of said line, the outer radius of the curved joint and the thickness of said curved joint;

adjusting the extensions of said welding nozzles; and performing the welding with the adjusted extension of said welding nozzles.

8. A method as set forth in claim 7 further comprising moving said welding nozzles in directions parallel with and normal to a line tangent to said welding line, independently of each other.

* * * * *